Patented Aug. 23, 1932

1,872,736

UNITED STATES PATENT OFFICE

FRITZ GÜNTHER AND JOSEF HETZER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SULPHONATED CONDENSATION PRODUCTS OF POLYHYDRIC ALCOHOLS AND AROMATIC HYDROCARBONS AND PROCESS OF PRODUCING SAME

No Drawing. Application filed February 1, 1928, Serial No. 251,222, and in Germany February 2, 1927.

This invention relates to the production of wetting, cleansing and emulsifying agents and the like.

We have found that products excellently suited to serve as wetting, lathering, cleansing, emulsifying or dispersing agents and the like are produced by treating aromatic or hydroaromatic hydrocarbons, or their sulfonic acids or salts thereof and which hydrocarbons will be referred to as hydrocarbons containing at least one aromatic nucleus, in the presence or absence of condensing agents, with aliphatic polyvalent alcohols or their derivatives containing at least one free hydroxy group and acting like the said alcohols themselves. Such derivatives are, for example, incompletely etherified polyvalent alcohols or such alcohols incompletely esterified by organic acids, such as formic acid, or inorganic acids, such a sulfuric acid. Also the unsaturated compounds, containing one or more double linkages, obtained from poly- or polyvalent alcohols by splitting off water, or the additive products the said unsaturated compounds formed by adding sulfuric acid on their double bonds, may be employed. All these compounds are to be regarded as equivalents for the purpose of the present invention since they react like the alcohols themselves and are hereinafter comprised by the term "polyvalent alcohols". If the condensation products of the cyclic compounds and the polyvalent alcohols contain no sulfonic acid group, the condensation product must be subjected to sulphonation, and this may also be effected when the condensation product contains one or more sulfonic acid groups and it is desired to introduce such further group or groups.

The new condensation products form excellent wetting agents and the like and may be employed in acid, neutral or alkaline baths, and also in those which contain electrolytes, lime, magnesia or other alkaline earth metal carbonates or sulfates, their application extending to a great variety of industrial branches, such as in washing, fulling, cleansing, dyeing, printing, carbonizing, dressing, mercerizing, degreasing, bast scouring, greasing, oiling, spinning, larding, sizing, bleaching, impregnating, tanning, in fat splitting, destroying pests, and in the production of plastic compositions. The said wetting agents and the like or their aqueous solutions may also be employed in association with other solid or liquid substances, and are therefore suitable for the production of preparations for the aforesaid typical purposes, and also for drill lubricants and the like.

The following examples will further illustrate the nature of the said invention, which, however, is not limited thereto. The parts are by weight.

Example 1.

90 parts of 1.3-butylene glycol are well stirred together with 116 parts of chlorsulfonic acid at about 20° C., 250 parts of 66° Bé. sulfuric acid and 64 parts of naphthalene being introduced into this mixture at the same temperature. After a short interval the temperature is raised, in the course of several hours, to about 50° C., stirring being continued throughout. The reaction will be complete in about 5 hours. When cold, the mass will be found to have separated into two layers, and the lower one can be run off.

The further treatment which may be carried on with the whole mass or confined to the upper layer only, may consist of a neutralization with alkali, or the reaction mass may be treated with lime and the resulting lime salt transformed, for example with sodium carbonate, into the sodium salt.

The naphthalene may be replaced by chlorinated, nitrated, hydrogenated or otherwise substituted naphthalenes or other cyclic hydrocarbons, and the 1.3-butylene glycol may be replaced, for example, by ethylene glycol and the like.

Example 2.

128 parts of naphthalene are mixed with 200 parts of sulfuric acid (66° Bé.) and heated for 20 minutes to 160° C. After cooling to about 100° C., a mixture prepared, while cooling, from 208 parts of ethylene glycol-monopropyl ether and 208 parts of sulfuric acid (66° Bé.), is run into the said solution while intensely stirring. Stirring is then continued for several hours the temperature being maintained at about 100° C., whereupon the mass is allowed to cool whereby it separates into two layers, the lower of which may be drawn off. The upper layer is worked up as described in Example 1.

Instead of starting from naphthalene sulfonic acid naphthalene may be used for obtaining a condensation product, which afterwards may be sulphonated. The aforesaid glycol ether may be replaced, for example, by 1.3-butylene glycol monoformate, a condensation product of similar properties being obtained. Instead of naphthalene or naphthalene sulfonic acid, also hydroaromatic compounds, such as tetrahydro-naphthalene, or sulfonic acids thereof may be employed.

What we claim is:

1. A process for producing wetting, cleansing and emulsifying agents which comprises condensing an aliphatic polyvalent alcohol with a hydrocarbon containing at least one aromatic nucleus, and sulphonating in a stage of the process.

2. A process for producing wetting, cleansing and emulsifying agents which comprises condensing an aliphatic polyvalent alcohol with a hydrocarbon containing at least one aromatic nucleus in the presence of a condensing agent, and sulphonating in a stage of the process.

3. A process for producing wetting, cleansing and emulsifying agents which comprises condensing a glycol with a hydrocarbon containing at least one aromatic nucleus in the presence of sulfuric acid, and sulphonating in a stage of the process.

4. As new articles of manufacture the condensation products of an aliphatic polyvalent alcohol with a hydrocarbon containing at least one aromatic nucleus, which contain at least one sulfonic acid group and possess excellent wetting, cleansing and emulsifying properties.

5. As new articles of manufacture the condensation products of ethylene glycol monopropylether with naphthalene, which contain at least one sulfonic acid group and possess excellent wetting, cleansing and emulsifying properties.

6. A process for producing wetting, cleansing and emulsifying agents which comprises condensing an aliphatic polyvalent alcohol with a hydrocarbon, containing a naphthalene nucleus and sulphonating in a stage of the process.

7. A process for producing wetting, cleansing and emulsifying agents which comprises condensing a glycol with a hydrocarbon, containing a naphthalene nucleus, and sulphonating in a stage of the process.

8. A process for producing wetting, cleansing and emulsifying agents which comprises condensing an aliphatic polyvalent alcohol with naphthalene, and sulphonating in a stage of the process.

9. A process for producing wetting, cleansing and emulsifying agents which comprises condensing a glycol with naphthalene, and sulphonating in a stage of the process.

10. A process for producing wetting, cleansing and emulsifying agents which comprises condensing 1.3-butylene glycol with naphthalene, and sulphonating in a stage of the process.

11. A process for producing wetting, cleansing and emulsifying agents which comprises condensing ethylene glycol-monopropyl ether with naphthalene and sulphonating in a stage of the process.

In testimony whereof, we have hereunto set our hands.

FRITZ GÜNTHER.
JOSEF HETZER.